United States Patent
Hiasa

(10) Patent No.: US 9,996,908 B2
(45) Date of Patent: Jun. 12, 2018

(54) IMAGE PROCESSING APPARATUS, IMAGE PICKUP APPARATUS, IMAGE PROCESSING METHOD, AND NON-TRANSITORY COMPUTER-READABLE STORAGE MEDIUM FOR ESTIMATING BLUR

(71) Applicant: CANON KABUSHIKI KAISHA, Tokyo (JP)

(72) Inventor: Norihito Hiasa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 18 days.

(21) Appl. No.: 15/177,423

(22) Filed: Jun. 9, 2016

(65) Prior Publication Data

US 2016/0371819 A1    Dec. 22, 2016

(30) Foreign Application Priority Data

Jun. 17, 2015  (JP) .................................. 2015-121679

(51) Int. Cl.
    *G06K 9/40*    (2006.01)
    *G06T 5/00*    (2006.01)
(52) U.S. Cl.
    CPC .... *G06T 5/003* (2013.01); *G06T 2207/10016* (2013.01); *G06T 2207/20016* (2013.01); *G06T 2207/20201* (2013.01)
(58) Field of Classification Search
    None
    See application file for complete search history.

(56) References Cited

U.S. PATENT DOCUMENTS

| 4,764,974 A | 8/1988 | Woods |
| 6,330,353 B1 * | 12/2001 | Lai ....................... G06K 9/6203 |
| | | 382/147 |

(Continued)

FOREIGN PATENT DOCUMENTS

| JP | 2005122721 A | 5/2005 |
| JP | 2008176735 A | 7/2008 |

(Continued)

OTHER PUBLICATIONS

Baraniuk. "Compressive Sensing." IEEE Signal Processing Magazine. Jul. 2007: 118-124.

(Continued)

*Primary Examiner* — Feng Niu
(74) *Attorney, Agent, or Firm* — Rossi, Kimms & McDowell LLP

(57) ABSTRACT

An image processing apparatus includes an acquirer which acquires a blurred image, and a generator which acquires a blur estimation area of at least a part of the blurred image to generate an estimated blur based on the blur estimation area, and the generator generates the estimated blur by performing iterative calculation processing that repeats correction processing and estimation processing, the correction processing correcting a blur included in information relating to a signal in the blur estimation area to generate information relating to a correction signal, and the estimation processing estimating a blur based on the information relating to the signal and the information relating to the correction signal, and generates, as the information relating to the correction signal, information relating to a plurality of correction signals by using a plurality of different calculation expressions in at least one correction processing during the iterative calculation processing.

15 Claims, 6 Drawing Sheets

(56) References Cited

U.S. PATENT DOCUMENTS

| | | | |
|---|---|---|---|
| 7,294,817 B2* | 11/2007 | Voigt | H04N 5/33 |
| | | | 250/208.1 |
| 7,616,826 B2 | 11/2009 | Freeman et al. | |
| 7,693,342 B2 | 4/2010 | Poon et al. | |
| 7,720,302 B2 | 5/2010 | Aoyama | |
| 8,358,865 B2* | 1/2013 | Bando | G06T 5/003 |
| | | | 382/254 |
| 8,380,000 B2* | 2/2013 | Lee | G06K 9/40 |
| | | | 382/255 |
| 8,787,643 B2* | 7/2014 | Narayanan | G06T 7/0028 |
| | | | 382/128 |
| 8,885,941 B2* | 11/2014 | Schiller | G06T 5/003 |
| | | | 382/180 |
| 9,008,453 B2* | 4/2015 | Fattal | G06T 5/003 |
| | | | 382/255 |
| 9,042,673 B2* | 5/2015 | Cho | G06T 5/003 |
| | | | 348/208.1 |
| 9,066,002 B2* | 6/2015 | Miyagi | G06K 9/00624 |
| 9,445,115 B2* | 9/2016 | DeWeert | H04N 19/42 |
| 2008/0025627 A1 | 1/2008 | Freeman et al. | |
| 2009/0015695 A1 | 1/2009 | Dunki-Jacobs et al. | |
| 2010/0080487 A1 | 4/2010 | Yitzhaky et al. | |
| 2010/0166332 A1* | 7/2010 | Lee | G06T 5/003 |
| | | | 382/255 |
| 2010/0302595 A1 | 12/2010 | Yamada et al. | |
| 2012/0162448 A1 | 6/2012 | Au et al. | |
| 2013/0016239 A1* | 1/2013 | Cho | H04N 5/23277 |
| | | | 348/208.4 |
| 2013/0120601 A1 | 5/2013 | Han | |
| 2013/0177260 A1 | 7/2013 | Fujii et al. | |
| 2013/0243319 A1* | 9/2013 | Cho | G06T 5/003 |
| | | | 382/168 |
| 2013/0271616 A1 | 10/2013 | Hirakawa et al. | |
| 2013/0315478 A1 | 11/2013 | Schiller et al. | |
| 2013/0343669 A1* | 12/2013 | Fattal | G06T 5/003 |
| | | | 382/255 |
| 2014/0140633 A1* | 5/2014 | Wang | G06T 5/003 |
| | | | 382/255 |
| 2014/0205201 A1 | 7/2014 | Sugiura et al. | |
| 2015/0294186 A1 | 10/2015 | Ali et al. | |
| 2016/0182807 A1 | 6/2016 | Schiller | |

FOREIGN PATENT DOCUMENTS

| | | |
|---|---|---|
| JP | 2009104639 A | 5/2009 |
| JP | 2015041200 A | 3/2015 |

OTHER PUBLICATIONS

Bioucas-Dias, et al. "A New TwIST: Two-Step Iterative Shrinkage/Thresholding Algorithms for Image Restoration." IEEE Transactions on Image Processing. Dec. 2007: 2992-3004. vol. 16, No. 12.

Donoho. "De-Noising by Soft-Thresholding." IEEE Transactions on Information Theory. May 1995: 613-627. vol. 41, No. 3.

Office Action issued in U.S. Appl. No. 15/177,451 dated Sep. 18, 2017.

Office Action issued in U.S. Appl. No. 15/177,494 dated Sep. 25, 2017.

Office Action issued in U.S. Appl. No. 15/177,494 dated Mar. 21, 2018.

* cited by examiner

IMAGE PROCESSING APPARATUS, IMAGE PICKUP APPARATUS, IMAGE PROCESSING METHOD, AND NON-TRANSITORY COMPUTER-READABLE STORAGE MEDIUM FOR ESTIMATING BLUR

BACKGROUND OF THE INVENTION

Field of the Invention

The present invention relates to an image processing method of estimating a blur as a deterioration component acting on a blurred image based on a single blurred image.

Description of the Related Art

Recently, according to the enhancement of high definition of a display apparatus, the improvement of the image quality of a captured image is required. Due to a deterioration factor such as an aberration or a diffraction of an optical system used for photography or a hand shake during the photography, the captured image loses information of an object space. Accordingly, a method of correcting the deterioration of the captured image based on these factors to obtain a high-quality image is previously proposed. As such a method, for example, there is a method of using Wiener filter or Richardson-Lucy method. However, in each of these method, a high correction effect cannot be obtained if a deterioration component (blur) acting on an image is not known.

On the other hand, previously, a method of estimating a hand shake component based on a single image deteriorated by the hand shake is proposed. U.S. Pat. No. 7,616,826 discloses a method of estimating the hand shake component in the image deteriorated by the hand shake by using statistical information relating to a strength gradient distribution of a known natural image. The natural image means an image where modern people naturally see for living. Accordingly, the natural image includes not only an image of trees or animals, but also an image of humans, architectures, electronic devices, or the like. As a characteristic of the natural image, it is known that a histogram (strength gradient histogram) relating to a strength gradient of a signal follows a heavy tailed distribution depending on the strength of the gradient. U.S. Pat. No. 7,616,826 discloses a method of applying a restriction where the strength gradient histogram of the hand-shake-corrected image follows the heavy tailed distribution to estimate a hand-shake-corrected image based only on the hand shake image. A blur component is estimated based on a comparison result between the hand-shake-corrected image and the hand shake image. In this case, the estimation accuracy of the blur component improves with increasing the number of edges included in the hand shake image.

However, the edge amount in the blurred image depends on a structure of a photographed object. Accordingly, the edge amount which is sufficient for the estimation does not always exist in the image. In particular, when a shape of the blur varies depending on an area in the image (called Shift-variant), it is necessary to estimate the blur only by using a specific partial area in the blurred image, and accordingly the edge amount tends to be insufficient. In an area where signal changes such as edges and textures are small, the estimation accuracy of the blur is extremely deteriorated. When the estimation method disclosed in U.S. Pat. No. 7,616,826 is used for the area, a large amount of error occurs in the estimated hand shake component. The same is true on a diffraction, an aberration, a defocus, and a disturbance, other than the hand shake (these deterioration factors are collectively called a "blur").

SUMMARY OF THE INVENTION

The present invention provides an image processing apparatus, an image pickup apparatus, an image processing method, and a non-transitory computer-readable storage medium which are capable of estimating a blur with high accuracy based on an area in a blurred image where a signal variation is small.

An image processing apparatus as one aspect of the present invention includes an acquirer configured to acquire a blurred image, and a generator configured to acquire a blur estimation area of at least a part of the blurred image to generate an estimated blur based on the blur estimation area, and the generator is configured to generate the estimated blur by performing iterative calculation processing that repeats correction processing and estimation processing, the correction processing correcting a blur included in information relating to a signal in the blur estimation area to generate information relating to a correction signal, and the estimation processing estimating a blur based on the information relating to the signal and the information relating to the correction signal and generate, as the information relating to the correction signal, information relating to a plurality of correction signals by using a plurality of calculation expressions different from each other in at least one correction processing during the iterative calculation processing.

An image pickup apparatus as another aspect of the present invention includes an image pickup element configured to photoelectrically convert an optical image formed via an optical system to output an image signal, an acquirer configured to acquire a blurred image, and a generator configured to acquire a blur estimation area of at least a part of the blurred image to generate an estimated blur based on the blur estimation area, and the generator is configured to generate the estimated blur by performing iterative calculation processing that repeats correction processing and estimation processing, the correction processing correcting a blur included in information relating to a signal in the blur estimation area to generate information relating to a correction signal, and the estimation processing estimating a blur based on the information relating to the signal and the information relating to the correction signal, and generate, as the information relating to the correction signal, information relating to a plurality of correction signals by using a plurality of calculation expressions different from each other in at least one correction processing during the iterative calculation processing.

An image processing method as another aspect of the present invention includes the steps of acquiring a blurred image, and acquiring a blur estimation area of at least a part of the blurred image to generate an estimated blur based on the blur estimation area, and the step of generating the estimated blur includes generating the estimated blur by performing iterative calculation processing that repeats correction processing and estimation processing, the correction processing correcting a blur included in information relating to a signal in the blur estimation area to generate information relating to a correction signal, and the estimation processing estimating a blur based on the information relating to the signal and the information relating to the correction signal, and generating, as the information relating to the correction signal, information relating to a plurality of correction signals by using a plurality of calculation expressions different from each other in at least one correction processing during the iterative calculation processing.

A non-transitory computer-readable storage medium as another aspect of the present invention stores an image processing program which causes a computer to execute the image processing method.

Further features of the present invention will become apparent from the following description of exemplary embodiments with reference to the attached drawings.

DESCRIPTION OF THE EMBODIMENTS

Figure 1:
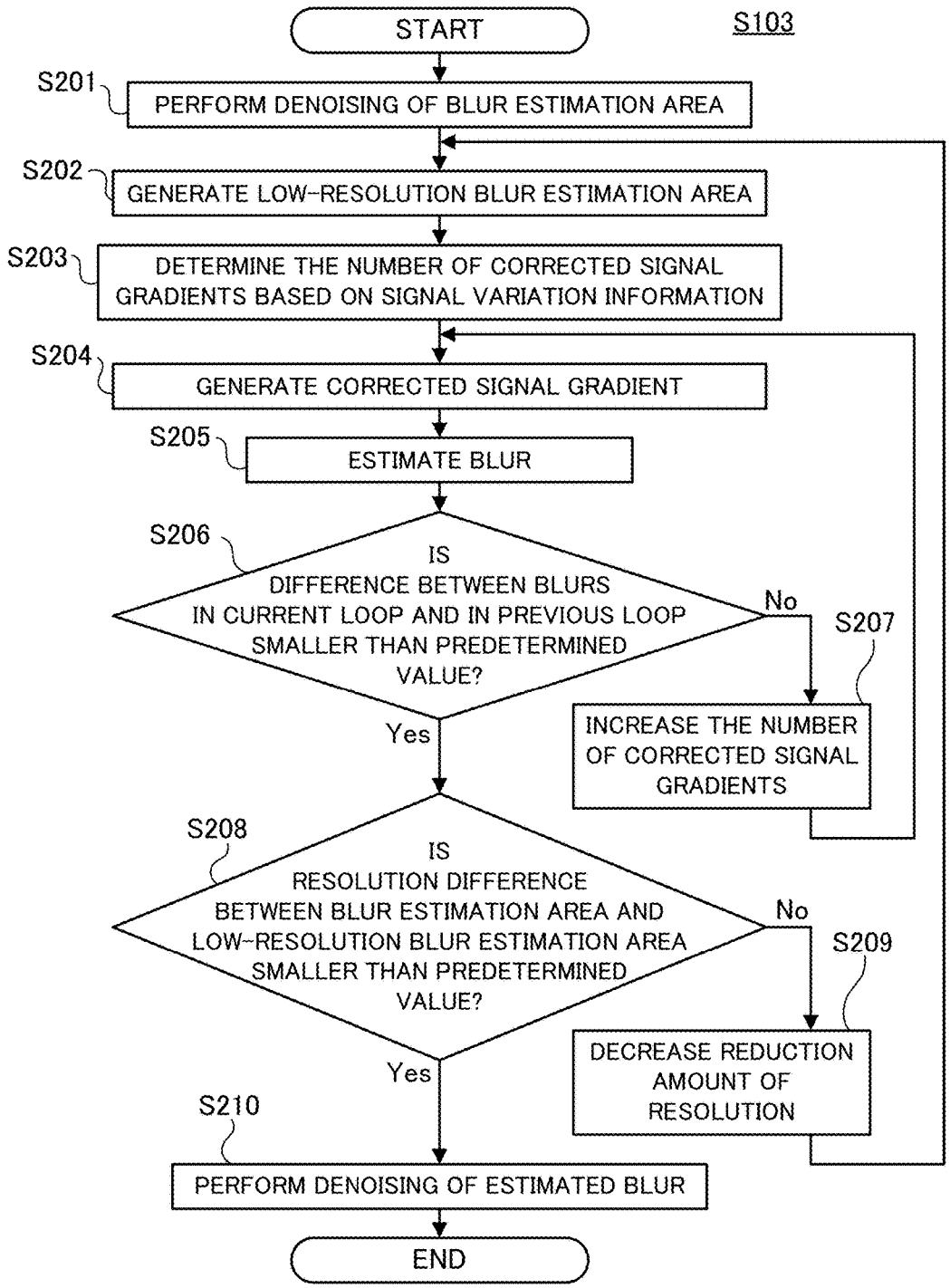
FIG. 1 is a flowchart of illustrating a method of generating an estimated blur in each of Embodiments 1 and 3.

Exemplary embodiments of the present invention will be described below with reference to the accompanied drawings. In each of the drawings, the same elements will be denoted by the same reference numerals and the duplicate descriptions thereof will be omitted.

In this embodiment, factors of deteriorating information of an object space are collectively referred to as a "blur", and the type of the blur includes a diffraction, an aberration, a defocus, a motion blur such as a hand shake and an object motion blur, and a disturbance. In this embodiment, first, the type of the blur will be described in detail.

The diffraction means a deterioration caused by a diffraction that occurs in an optical system of an image pickup apparatus which captures an image. This occurs because an opening diameter of the optical system is finite.

The aberration is a deterioration caused by a shift from an ideal wavefront that occurs in the optical system. The aberration occurring by a designed value of the optical system is called a designed aberration, and the aberration occurring by a manufacturing error of the optical system or an environmental change is called an error aberration. The environmental change means a change in temperature, humidity, atmospheric pressure, or the like, and the performance of the optical system varies depending on the change. The term "aberration" includes both of the designed aberration and the error aberration.

The defocus is a deterioration caused by a displacement between a focus point of the optical system and an object. The defocus for an entire image is called a focus shift, and the defocus for only a part of the image is called a defocus blur. Specifically, the defocus blur is a component which deteriorates information of a background on condition that there are main object and the background with different distances in the image and that the focusing is performed on the main object. The deterioration varies depending on a distance from the background to the main object in a depth direction. For example, the defocus blur is used as a representation method of emphasizing the main object in the image. The term "defocus" includes both of the focus shift and the defocus blur.

The motion blur is a deterioration generated by changing a relative relationship (position and angle) between an object and an image pickup apparatus during exposure for photography. The deterioration for an entire image is called a hand shake, and the deterioration for a part of the image is called an object motion blur. The term "motion blur" includes both of the hand shake and the object motion blur.

The disturbance is a deterioration generated by a swaying material which exists between an object and an image pickup apparatus during the photography. For example, there is the sway of air and the sway of water in underwater photography. When the disturbance occurs during a short-time exposure, the blur image includes a curved line where a straight line in an object space is swayed. In order to correct the curve, a plurality of frame images (or images obtained by continuous shots) with different disturbance components may be synthesized. However, in such synthesis processing, a deterioration of a frequency component remains while the curve of an edge can be corrected. The blurred image in this embodiment includes the synthesized image obtained by synthesizing the plurality of frames (or images obtained by the continuous shots) as described above in addition to an image (image obtained with a long-time exposure) in which the frequency component is deteriorated due to the disturbance during a single exposure.

In this embodiment, a point spread function is denoted by PSF. While processing on a one-dimensional (monochrome) image will be described in this embodiment, the embodiment can be applied also to a multidimensional (for example, RGB) image similarly and the processing may be performed for each channel of RGB. For blurs which do not have any difference between the channels or blurs with differences which are ignorable, the processing may be performed while reducing the number of the channels (for example, changing the RGB image to a monochrome image). If each channel acquires a different wavelength, the motion blur occurs as a blur without any difference between the channels.

On the other hand, the blur relating to each of the aberration, the diffraction, the defocus, and the disturbance varies depending on a wavelength. With respect to the defocus, a spread of the blur varies depending on the wavelength due to an influence of an axial chromatic aberration even when a position of the optical system is significantly away from a focus position. However, if a performance difference between the channels is sufficiently small with respect to a sampling frequency of an image pickup element being used for the photography even for the blur with the wavelength dependence, it is assumed that the difference between the channels can be ignored. When the blur where the difference between the channels can be ignored is to be estimated, it is preferred that a blur is estimated with using the plurality of channels rather than performing reduction processing of the number of the channels. The blur is estimated by using information relating to a signal gradient of an image, and accordingly the estimation accuracy is improved with increasing an amount of the information. In other words, if the blur is estimated by using the plurality of images without decreasing the number of the channels, the information of the signal gradient increases (however, if an image (i.e., wavelength) of each channel coincides with a multiple of one of the images proportionally, the information of the signal gradient does not increase), and accordingly, the blur can be estimated with higher accuracy. While an example in which the image with different wavelengths as channels is captured is described in this embodiment, the same is true on other parameters such as polarization.

Before describing specific examples, an outline of this embodiment will be described briefly. A blur estimation area where a blur is estimated based on a blurred image is acquired, and a signal gradient in the blur estimation area is compared with a corrected signal gradient where a blur of the signal gradient has been corrected to generate an estimated blur. In this case, if a signal variation in the blur estimation area is small, the estimation accuracy of the estimated blur is decreased. In order to solve this problem, a plurality of corrected signal gradients are generated based on the signal gradient by using various correction processing or various correction parameters. As a result, the signal variation in the blur estimation area can be increased and accordingly the estimation accuracy of the estimated blur can be improved.

Embodiment 1

Figure 2:
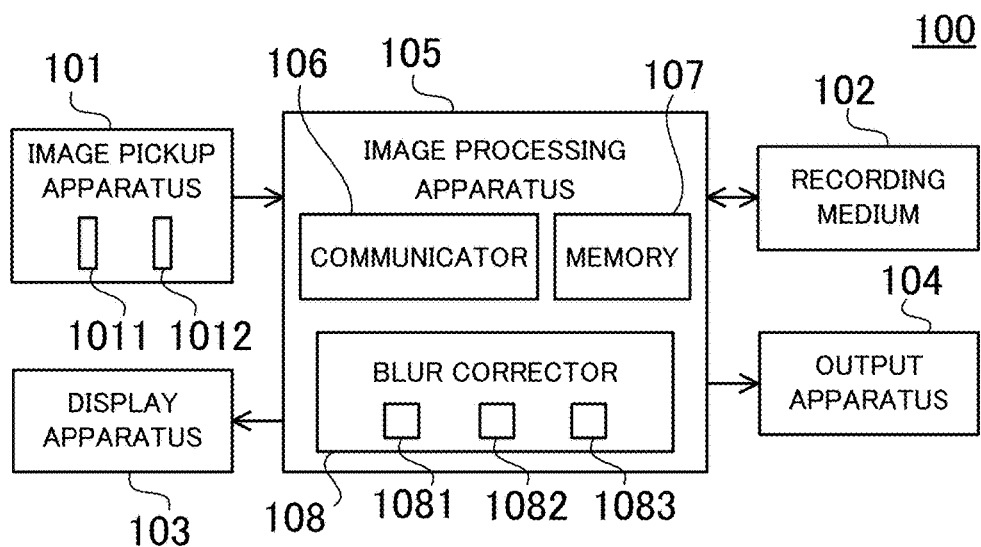
FIG. 2 is a block diagram of an image processing system in Embodiment 1.
Figure 3:
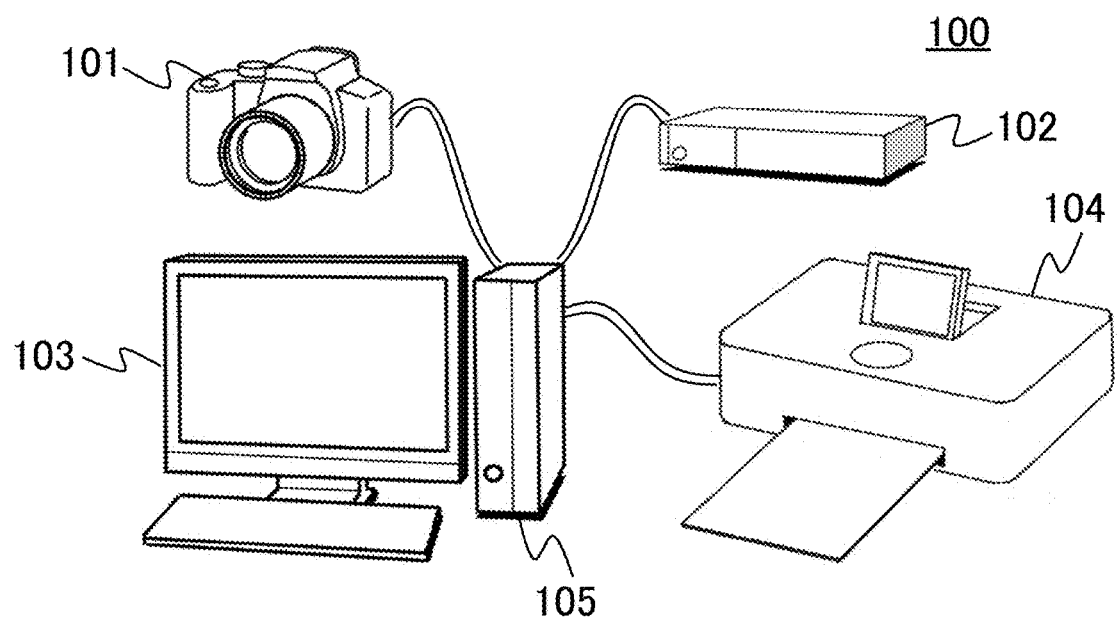
FIG. 3 is an external view of an image processing system in each of Embodiments 1 and 2.

First, referring to FIGS. 2 and 3, an image processing system in Embodiment 1 of the present invention will be described. FIG. 2 is a block diagram of the image processing system 100 in this embodiment. FIG. 3 is an external view of the image processing system 100.

The image processing system 100 includes an image pickup apparatus 101, a recording medium 102, a display apparatus 103, an output apparatus 104, and an image processing apparatus 105. The image processing apparatus 105 includes a communicator 106, a memory 107, and a blur corrector 108 (image processor). The blur corrector 108 includes an acquirer 1081 (acquisition unit), a generator 1082 (generation unit), and a corrector 1083 (correction unit). Each unit of the blur corrector 108 performs an image processing method of this embodiment as described below. The image processing apparatus 105 (blur corrector 108) may be included inside the image pickup apparatus 101.

The image pickup apparatus 101 includes an optical system 1011 (image pickup optical system) and an image pickup element 1012 (image sensor). The optical system 1011 images a light ray from an object space on the image pickup element 1012. The image pickup element 1012 includes a plurality of pixels, and it photoelectrically converts an optical image (object image) formed via the optical system 1011 to output an image signal. The image pickup apparatus 101 generates a captured image (blurred image) based on the image signal output from the image pickup element 1012. The blurred image obtained by the image pickup apparatus 101 is output to the image processing apparatus 105 through the communicator 106. With respect to the blurred image, information of the object space is deteriorated due to the action of at least one of various blurs as described above.

The memory 107 stores the blurred image input to the image processing apparatus 105 and information relating to an image capturing condition determined when capturing the blurred image. The image capturing condition includes, for example, a focal length, an aperture stop, a shutter speed, and an ISO sensitivity of the image pickup apparatus 101 at the time of photography. The blur corrector 108 estimates and corrects a specific blur component based on the blurred image to generate a blur-corrected image. The blur-corrected image is output to at least one of the display apparatus 103, the recording medium 102, and the output apparatus 104 through the communicator 106. The display apparatus 103 is for example a liquid crystal display or a projector. A user can work while confirming the image under processing through the display apparatus 103. The recording medium 102 is for example a semiconductor memory, a hard disk, or a server on a network. The output device 104 is for example a printer. The image processing apparatus 105 has a function that performs development processing and other image processing as needed.

In order to achieve the image processing method of this embodiment, software (image processing program) can be supplied to the image processing apparatus 105 through a network or a non-transitory computer-readable storage medium such as a CD-ROM. In this case, the image processing program is readout by a computer (such as a CPU and a MPU) of the image processing apparatus 105 to execute a function of the blur corrector 108.

Figure 4:
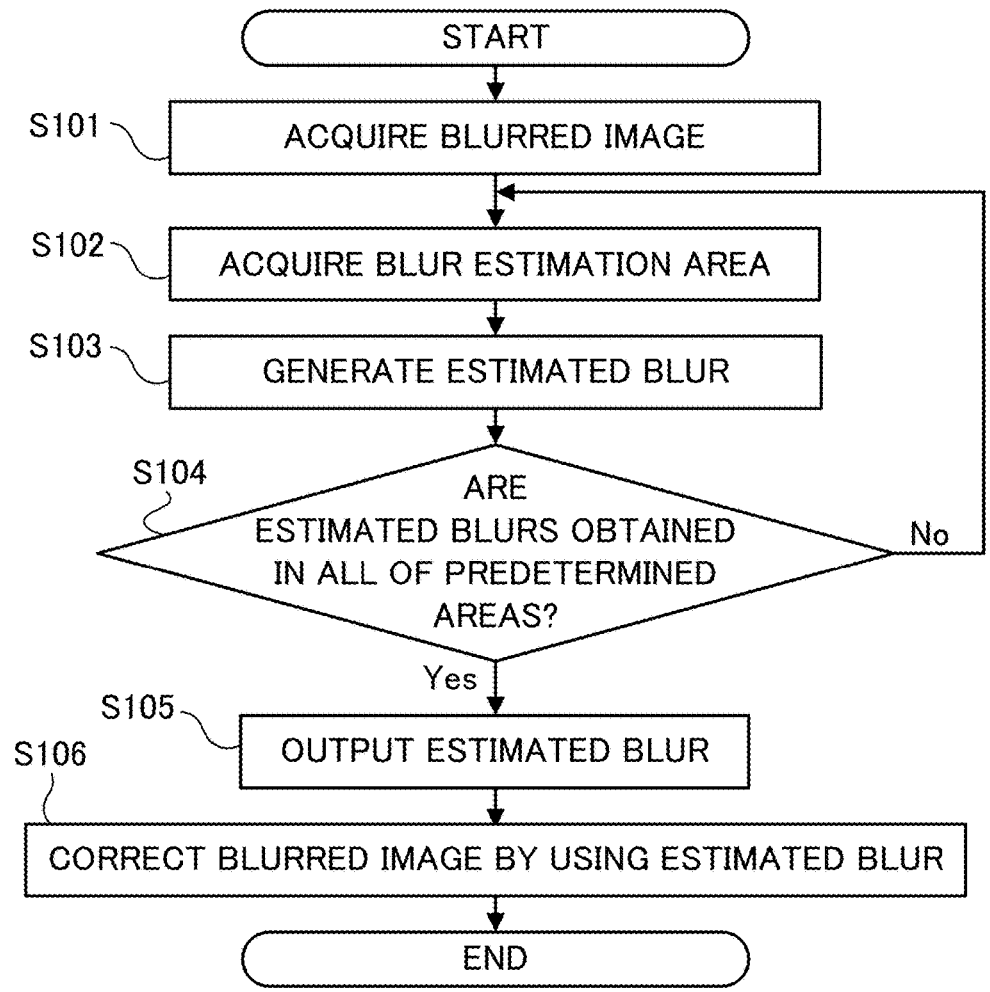
FIG. 4 is a flowchart of illustrating an image processing method in each of Embodiments 1 and 3.

The blur corrector 108 performs image processing illustrated in the flowcharts of FIGS. 1 and 4. Before describing the image processing, a method (correction processing) of correcting a blur of a signal gradient in a blur estimation area (at least a part of a blurred image) and a method (estimation processing) of estimating a blur will be described. In this embodiment, the signal gradient means information relating to a signal in the blur estimation area, and it includes information relating to an image itself (i.e., luminance distribution of the image) or information (i.e., information relating to a differential value) relating to n-th order differential (n is a natural number including zero) of the luminance distribution.

In this embodiment, the blur (deterioration component) is estimated in the form of PSF, but it is not limited thereto. For example, the blur may be estimated in the form of OTF (Optical Transfer Function) obtained by the Fourier transform of the PSF. First, an appropriate initial value of the PSF (such as a Gauss distribution and a one-dimensional line) is given, and the blur of the signal gradient in the blur estimation area is corrected by using the PSF to generate a corrected signal gradient. Subsequently, the PSF is estimated based on the signal gradient and the corrected signal gradient. The signal gradient of the blur estimation area is corrected again to generate a new (updated) corrected signal gradient to estimate the PSF. By repeating the processing (loop processing), the blur can be estimated based on only the blurred image (i.e., blur estimation area).

Next, the method of correcting the blur of the signal gradient (i.e., correction processing) will be specifically described. The relationship between the blur estimation area and the blur can be represented by expression (1) below.

$$b_i = k_i * a_i + n_i \quad (1)$$

In expression (1), symbol $b_i$ denotes a signal distribution in the blur estimation area in the i-th loop processing, symbol $k_i$ denotes a blur, symbol $a_i$ denotes a signal distribution without the deterioration caused by the blur $k_i$, and symbol $n_i$ denotes a noise. Symbol "*" represents a convolution.

By solving the optimization problem that is represented by expression (2) below, an estimation value $d_i$ (corresponding to a corrected signal distribution) of the signal distribution $a_i$ in the i-th loop processing is estimated.

$$\underset{d_i}{\mathrm{argmin}}[L(k_i * d_i) + \Phi(d_i)] \qquad (2)$$

In expression (2), symbol L denotes a loss function and symbol $\Phi$ denotes a regularization term for the estimation value $d_i$, and each specific example will be described below. The loss function L has an effect of fitting a solution into a model (represented by expression (1) in this embodiment). The regularization term $\Phi$ has an effect of converging a solution into a most likely value. For the regularization term $\Phi$, a characteristic that the solution ($a_i$) called a previous knowledge is to have is used. The regularization term $\Phi$ has a role of avoiding excessive fitting (i.e., avoiding reflection of the influence of the noise $n_i$ to the estimation value $d_i$) which occurs when the loss function L is only considered. If the blur estimation area is acquired from a plurality of channels (for example, RGB), expression (2) is solved for each channel.

While the corrected signal gradient is obtained by solving expression (2) in this embodiment, other method can be used. For example, a method of using an inverse filter such as Wiener filter or a super-resolution method such as Richardson-Lucy method can be used. In addition to the inverse filter or the super-resolution processing, the corrected signal gradient may be generated by applying a tapered filter such as a shock filter. Furthermore, when the tapered filter is applied together, it is preferred that a smoothing filter such as a bilateral filter and a guided filter which maintains a sense of resolution of an edge is used to suppress noise or ringing. When generating a plurality of corrected signal gradients, they may be generated by using various methods, that is, methods different from each other (for example, using the optimization by expression (2) and the inverse filter).

Next, a specific example of the loss function L and the regularization term $\Phi$ in expression (2) will be described. As the loss function L, a function represented by expression (3) below is considered.

$$L(k_i * d_i) = \|k_i * d_i - b_i\|_2^2 \qquad (3)$$

In expression (3), a symbol represented by expression (4) below represents $L_{-p}$ norm (p-th order average norm), and it indicates Euclidean norm when p is equal to 2 (p=2).

$$\|\cdot\|_p \qquad (4)$$

As an example of the regularization term $\Phi$, a first-order average norm represented by expression (5) below is presented.

$$\Phi(d_i) = \lambda \|\Psi(d_i)\|_1 \qquad (5)$$

In expression (5), symbol $\lambda$ is a parameter that represents a weight of the regularization term $\Phi$, and symbol $\Psi$ is a function that represents a change of basis for an image such as wavelet transform and discrete cosine transform. The regularization term $\Phi$ in expression (5) is based on a characteristic that a signal component becomes sparse, that is, it can be represented by the smaller number of signals by performing the change of basis such as the wavelet transform and the discrete cosine transform on an image. For example, this is described in "Richard G. Baraniuk, 'Compressive Sensing', IEEE SIGNAL PROCESSING MAGAZINE [118] JULY 2007". As other examples of the regularization term, Tikhonov regularization term or TV (Total Variation) norm regularization term may be used.

In order to solve the estimation expression represented by expression (2) as an optimization problem, by using a method of using the iterative calculation, for example a conjugate gradient method may be used when the Tikhonov regularization term is adopted. When expression (5) or the TV norm regularization term is adopted, for example TwIST (Two-step Iterative Shrinkage/Thresholding) may be used. TwIST is described in "J. M. Bioucas-Dias, et al., 'A new TwIST: two-step iterative shrinkage/thresholding algorithms for image restoration', IEEE Trans. on Image Processing, vol. 16, December 2007".

When the iterative calculation is performed, a parameter such as a weight of the regularization may be updated for each iteration. While expressions (1) and (2) are represented for an image (signal distribution), they are satisfied similarly for a differential of the image. Accordingly, instead of the image, blur correction may be performed for the differential of the image (both of the image and the differential of the image are represented as a signal gradient).

Next, a method of estimating a blur (i.e., estimation processing) will be specifically described. Similarly to expression (2), the PSF can be estimated by using expression (6) below.

$$\underset{k_i}{\mathrm{argmin}}[L(k_i * d_i) + \Phi(k_i)] \qquad (6)$$

If the blur estimation area is acquired from a plurality of channels (i.e., if the blur does not vary depending on the channel, or the change of the blur depending on the channel can be ignored), expression (6) is deformed as represented by expression (6a) below.

$$\underset{k_i}{\mathrm{argmin}}\left[\sum_{h=1}^{H} v_h L(k_i * d_{i,h}) + \Phi(k_i)\right] \qquad (6a)$$

In expression (6a), symbol H denotes the total number of the channels included in the blur estimation area, symbol $d_{i,h}$ denotes $d_i$ for the h-th channel, and symbol $v_h$ denotes a weight. While expression (2) is solved for each channel in the correction of the signal gradient, a form which is collected by all channels as represented by expression (6a) is used in the blur estimation. This is because targets to be estimated are common (i.e., the same PSF) in expression (6a) while the targets are different in each channels in expression (2).

As the loss function L in each of expressions (6) and (6a), expression (7) below is considered.

$$L(k_i * d_i) = \sum_j u_j \|k_i * \partial_j d_i - \partial_j b_i\|_2^2 \qquad (7)$$

In expression (7), symbol $\partial_j$ denotes a differential operator. Symbol $\partial_0$ (j=0) denotes an identity operator, and symbols $\partial_x$ and $\partial_y$ denote differentials in a horizontal direction and a vertical direction of an image, respectively. A higher order differential is denoted by for example $\partial_{xx}$ or $\partial_{xyy}$. While the signal gradient of the blur estimation area includes all of "j" (j=0, x, y, xx, xy, yy, xxx, . . . ), this embodiment considers only the case of j=x,y. Symbol $u_j$ denotes a weight.

The regularization term $\Phi$ in expression (6) can be used according to the characteristic of the PSF being estimated.

For example, if the PSF has a crushed shape like a defocus, it is preferred that TV norm regularization as represented by expression (8) below is used.

$$\Phi(k_i) = \zeta \|\nabla k_i\|_{TV} = \zeta \sqrt{(\partial_x k_i)^2 + (\partial_y k_i)^2} \quad (8)$$

In expression (8), symbol $\zeta$ denotes a weight of the regularization term.

If the PSF has a line shape like a motion blur, it is preferred that first-order average norm regularization as represented by expression (9) below is used.

$$\Phi(k_i) = \zeta \|k_i\|_1 \quad (9)$$

As a regularization term that does not depend on a shape of the PSF and that can be solved quickly with accuracy to some extent, Tikhonov regularization may be used.

Next, an image processing method in this embodiment will be described. In this embodiment, during loop processing of repeating (iterating) the generation of the corrected signal gradient and the estimation of the blur, a plurality of corrected signal gradients are generated at least once by using a plurality of correction processing or a plurality of correction parameters. The detail of this effect will be described blow. First, a case where a single corrected signal gradient is generated will be described, and then an effect caused by the generation of the plurality of corrected signal gradients will be described.

As can be seen in expression (1), the blur $k_i$ as a target to be estimated in the blur estimation is represented by a linear equation. This linear equation exists by the number of pixels in the blur estimation area $b_i$, and accordingly the estimation of the blur $k_i$ corresponds to a problem which solves a system of equations whose number is the number of pixels in the blur estimation area $b_i$. Accordingly, when the number of independent linear equations is larger than the number of unknowns, the solution is determined uniquely. However, typically, the number of the independent linear equations is not larger than the number of the unknowns. This is because the noise $n_i$, as well as the blur $k_i$, is unknown (when obtaining the blur, $a_i$ is known since an estimated value $d_i$ is substituted into $a_i$). In other words, the number of the unknowns corresponds to a sum of the number of components of the blurs $k_i$ and the number of components of the noises $n_i$ (which is equal to the number of the pixels in the blur estimation area $b_i$), and it is always larger than the number of the linear equations (i.e., the number of pixels in the blur estimation area $b_i$). Accordingly, in order to obtain the blur $k_i$, estimation processing is necessary.

Hereinafter, a method of suppressing the influence of the noise $n_i$ and obtaining the blur $k_i$ with high accuracy will be considered. First, with respect to expression (1), it is assumed that a noise is included in each of the system of linear equations (whose number is equal to the number of pixels in the blur estimation area $b_i$) with unknowns $k_i$ (whose number is equal to the number of components). In this case, the number of pixels in the blur estimation area $b_i$ is larger than the number of components of $k_i$. If any noise is not included, there is a dependent linear equation in the system of linear equations since the number of the system of the linear equations is larger than the number of unknowns. In other words, there are a plurality of identical equations. However, in reality, there is a noise, and accordingly the equations are shifted (i.e., different) due to the noise. On the other hand, the nose can be suppressed by averaging signals which have the same original signals and have different noises. Therefore, if there are a lot of dependent linear equations which have different noises, it is possible to perform the blur estimation while the influence of the noise is suppressed due to the averaging effect. When the noise suppressing effect by the averaging sufficiently works, the regularization term $\Phi$ in each of expressions (6) and (6a) may be set to zero.

In order to estimate the blur $k_i$ with high accuracy, an additional condition exists. The condition is that the number of the independent equations is as large as possible in the system of linear equations from which noises have been removed. If the number of the independent equations is too small compared with the number of components of the blurs $k_i$ (i.e., the number of unknowns), a sufficient accuracy cannot be obtained in the estimation. Coefficients of the system of the linear equations are the corrected signal gradients $d_i$, and accordingly the corrected signal gradients $d_i$ need to have various combinations in order to increase the number of the independent equations. In other words, in the blur estimation area, the estimation accuracy improves with increasing signal changes (such as an edge, texture, and gradation) having various directions or strengths. For example, if signal values of the blur estimation area $b_i$ and the corrected signal gradient $d_i$ are constant (completely flat portion in an image), the equations in the system of linear equations represented by expression (1) are completely identical (except for noises), and accordingly the blur $k_i$ cannot be estimated.

As discussed above, if there are a lot of signal changes which have various directions or strengths in the blur estimation area and there are a lot of signal changes which have different noises while the signal changes are the same, the estimation accuracy of the blur is improved. In order to achieve the improvement, in this embodiment, during the generation of the corrected signal gradient, the plurality of corrected signal gradients $d_i$ is generated based on the signal gradient $b_i$ in a single blur estimation area. For the generation of the plurality of corrected signal gradients (i.e., information relating to a plurality of corrected signals), a plurality of different calculation expressions from each other, i.e., a plurality of different correction processing or different parameters (correction parameters) from each other are used.

The correction processing means a method of correcting a blur (such as optimization according to expression (2), an inverse filter like Wiener filter, and a super-resolution method such as Richardson-Lucy method) or a regularization term (such as a first-order averaged norm regularization according to expression (5) and TV norm regularization) which is used for the optimization according to expression (2). Whether or not the filtering (such as a tapered filter and a smoothing filter) is applied after the blur correction is included in the correction processing. The correction parameter means a weight (for example, $\lambda$ in expression (5)) of the regularization term in expression (2), a super-resolving parameter in the super-resolution method such as Richardson-Lucy method, or a parameter which represents a sharpness or a smoothness in the filtering.

When the plurality of corrected signal gradients are generated while the correction processing or the correction parameters are changed, the behavior of the signal changes and the noises are different since the correction is applied to the corrected signal gradients differently from each other. In other words, by generating the plurality of corrected signal gradients, the number of the system of equations in expression (1) increases. For example, if two corrected signal gradients are generated, the number of the system of equations in expression (1) doubles. This is because the system of equations are made by the number of pixels in the blur estimation area by using one corrected signal gradient and blurred signal gradient, and the system equations are made by the same number by using the other corrected signal gradient and blurred signal gradient. In other words, while the number of the system of linear equations corresponds to the number of pixels in the blur estimation area when only one corrected signal gradient is generated, the number of the system of the linear equations is multiplied proportionally by the number of the generated corrected signal gradients when the plurality of corrected signal gradients are generated. Accordingly, by generating the plurality of corrected signal gradients, the blur can be estimated with high accuracy even in the blur estimation area where the signal change is small.

If the plurality of corrected signal gradients are generated, expressions (6) and (6a) are represented by expressions (10) and (10a) below, respectively.

$$\underset{k_i}{\mathrm{argmin}}\left[\sum_{g=1}^{G} t_g L(k_i * d_{i,g}) + \Phi(k_i)\right] \quad (10)$$

$$\underset{k_i}{\mathrm{argmin}}\left[\sum_{g=1}^{G}\sum_{h=1}^{H} t_g v_h L(k_i * d_{i,g,h}) + \Phi(k_i)\right] \quad (10a)$$

In expressions (10) and (10a), symbol G denotes the total number of the corrected signal gradients which is used for the estimation of a common blur, and symbol $t_g$ denotes a weight.

Next, referring to FIG. 4, image processing that is performed by the blur corrector 108 will be described. FIG. 4 is a flowchart of illustrating an image processing method in this embodiment. Each step in FIG. 4 is performed by the acquirer 1081, the generator 1082, and the corrector 1083 in the blur corrector 108.

First, at step S101, the acquirer 1081 of the blur corrector 108 acquires a blurred image (captured image). Subsequently, at step S102, the generator 1082 of the blur corrector 108 acquires a blur estimation area based on the blurred image. Assuming that an identical blur acts on the blur estimation area, the generator 1082 estimates a blur. The acquirer 1081 may acquire, as the blur estimation area, an area specified by a user or alternatively may acquire the blur estimation area automatically. If the blur is uniform in a whole of the blurred image (i.e., Shift-invariant), the whole of the blurred image may be set as the blur estimation area. As an example of Shift-invariant, there are a hand shake in which a whole of the image pickup apparatus 101 is shifted during exposure, a diffraction by the optical system 1011 in the image pickup apparatus 101 (if vignetting is sufficiently small), and the like. When the blur varies depending on a position in the blurred image (i.e., Shift-variant), it is preferred that the blurred image is divided into a plurality of partial areas and one partial area of the plurality of divided partial areas is set as the blur estimation area.

Subsequently, at step S103, the generator 1082 generates an estimated blur based on the blur estimation area. The detail of step S103 is illustrated in the flowchart of FIG. 1, and the description will be given below. Subsequently, at step S104, the generator 1082 determines whether or not the generation of the estimated blur is completed with respect to all predetermined areas in the blurred image (for example, a whole of the blurred image). When the generation of the estimated blur is completed, the flow proceeds to step S105. On the other hand, when the generation of the estimated blur is not completed, the flow returns to step S102. Then, the generator 1082 acquires, as a new (i.e., updated) blur estimation area, a partial area where the estimated blur is not still generated based on the predetermined area in the blurred image.

At step S105, the generator 1082 outputs the generated estimated blur. When a plurality of blur estimation areas are included in the predetermined area of the blurred image (i.e., a case of Shift-variant), a plurality of estimated blurs exist. Accordingly, the generator 1082 outputs the plurality of estimated blurs. In this embodiment, the estimated blur is data relating to the PSF. However, this embodiment is not limited thereto, and the estimated blur may be output in the form of an OTF, coefficient data obtained by fitting the PSF or the OTF with a certain basis, or an image obtained by converting the PSF or the OTF into image data.

Subsequently, at step S106, the corrector 1083 of the blur corrector 108 corrects the blur (deterioration component) included in the blurred image based on the estimated blur output from the generator 1082 at step S105. This correction can be performed, for example, by using a method of using an inverse filter such as Wiener filter or a super-resolution method such as Richardson-Lucy method. When the plurality of estimated blurs exist, the correction is performed by using the estimated blurs corresponding to the blur estimation areas where the respective estimated blurs have been obtained. Alternatively, before all the estimated blurs are output, blurs of the blur estimation areas may be corrected sequentially by using the estimated blurs generated at step S103 and then they may be combined with each other to acquire a blur-corrected image.

Next, referring to FIG. 1, generation processing (step S103) of the estimated blur will be described in detail. FIG. 1 is a flowchart of illustrating the method of generating the estimated blur. Each step in FIG. 1 is performed by the generator 1082 of the blur corrector 108.

First, at step S201, the generator 1082 performs denoising of the blur estimation area. The denoising of the blur estimation area is performed to reduce a deterioration of an estimation accuracy of the blur, which is caused by the existence of the noise in the blur estimation area. Instead of step S201, a step of denoising a whole of the blurred image may be inserted prior to step S102 in FIG. 4. As a denoising method, a method of using a bilateral filter, a NLM (Non Local Means) filter, or the like may be used.

Preferably, the generator 1082 performs the denoising of the blur estimation area by the following method. First, the generator 1082 performs frequency resolving (frequency decomposition) of the blur estimation area to generate a frequency-resolved blur estimation area. Then, the generator 1082 performs the denoising of the frequency-resolved blur estimation area based on a noise amount in the blur estimation area. Next, the generator 1082 resynthesizes the frequency-resolved blur estimation area to acquire a noise-reduced blur estimation area. Typically, in addition to an effect of reduction of a noise in an image, the denoising processing has a problem that causes a blur of the image. If the blur estimation area is blurred by the denoising, a PSF where a blur which originally deteriorates an image is mixed with a blur caused by the denoising is estimated when performing estimation processing at the latter stage. Accordingly, it is preferred that a denoising method in which an amount of a blur given to the image is small. As such a method, denoising processing with the use of the frequency decomposition of an image is applied. In this embodiment, an example where wavelet transform is used as the frequency decomposition will be described. The detail is described in "Donoho D. L., 'De-noising by soft-thresholding', IEEE Trans. on Inf. Theory, 41, 3, pp. 613-627".

The wavelet transform is a transformation in which a frequency analysis is performed for each position in an image by using a localized small wave (wavelet) to resolve a signal into a high frequency component and a low frequency component. In the wavelet transform of an image, the wavelet transform is performed in a horizontal direction of the image to resolve the image in the low frequency component and the high frequency component, and further the wavelet transform is performed in a vertical direction of the resolved low frequency component and high frequency component. According to the wavelet transform, the image is divided into four areas, and thus four sub-band images with different frequency bands from each other is obtained by the frequency resolving (frequency decomposition). In this case, a sub-band image of a low frequency band component (scaling coefficient) at the upper left is denoted by LL1, and a sub-band image of a high frequency band component (wavelet coefficient) at the lower right is denoted by HH1. Sub-band images at the upper right (HL1) and at the lower left (LH1) correspond to an image obtained by extracting the high frequency band component in the horizontal direction and the low frequency band component in the vertical direction, and an image obtained by extracting the low frequency band component in the horizontal direction and the high frequency band component in the vertical direction, respectively.

Furthermore, when the wavelet transform is performed on the sub-band image LL1, the image size halves to be resolved into sub-band images LL2, HL2, LH2, and HH2, and accordingly the resolved sub-band image LL can be resolved by the number of times of a transformation level.

As a method of performing noise reduction processing by using the wavelet transform, thresholding is known. In the thresholding, a component which is smaller than a set threshold value is regarded as a noise, and the noise is reduced. Threshold value processing in the wavelet space is performed on sub-band images other than the sub-band image LL, and as represented by expression (11) below, a wavelet coefficient $w_{subband}(x,y)$ having an absolute value not greater than a threshold value is replaced with zero to perform the denoising.

$$w_{subband}(x, y) = \begin{cases} w_{subband}(x, y), & \text{if } |w_{subband}(x, y)| > \rho_{subband}\sigma \\ 0, & \text{if } |w_{subband}(x, y)| \le \rho_{subband}\sigma \end{cases} \quad (11)$$

In expression (11), symbols x and y denote vertical and horizontal coordinates in an image, symbol $\rho_{subband}$ denotes a weight parameter, and symbol $\sigma$ denotes a standard deviation of the noise (noise amount). The noise amount $\sigma$ included in the blur estimation area is obtained by measurement or estimation based on the blur estimation area. If the noise is white Gaussian noise that is uniform in a real space and a frequency space, a method of estimating the noise in the blur estimation area based on MAD (Median Absolute Deviation) as represented by expression (12) below is known.

$$MAD = \text{median}(|w_{HH1} - \text{median}(w_{HH1})|) \quad (12)$$

The MAD is obtained by using the median (central value) of a wavelet coefficient $w_{HH1}$ in the sub-band image HH1 obtained by the wavelet transform of the blur estimation area. The standard deviation and the MAD have a relationship represented by expression (13) below, and accordingly the standard deviation of the noise component can be estimated.

$$\sigma = \frac{MAD}{0.6745} \quad (13)$$

The noise amount $\sigma$ may be acquired based on an image capturing condition (ISO sensitivity during the photography) instead of using expressions (12) and (13).

Subsequently, at step S202, the generator 1082 reduces a resolution of the blur estimation area to generate a low-resolution blur estimation area. With a reduction of the resolution of the blur estimation area, the resolution of the blur being estimated is reduced similarly. As a result, a convergence of the blur estimation described below is improved, and the possibility that the estimation result is a local solution which is different from an optimum solution can be reduced. A rate of decreasing the resolution in the blur estimation area is determined depending on a down-sampling parameter. While Step S202 is performed a plurality of times by loop processing (i.e., iterative calculation), at the time of a first execution, a prescribed down-sampling parameter is used. At the time of a second and subsequent executions, the low-resolution blur estimation area is generated by using a down-sampling parameter set at step S209 described below. A reduction amount of the resolution decreases with increasing the number of times of the iterations of the loop, and the resolution of the low-resolution blur estimation area comes close to the blur estimation area. In other words, first, a low-resolution blur is estimated, and the estimation result is set as an initial value to repeat the estimation while increasing the resolution gradually. As a result, an optimum blur can be estimated while the local solution is avoided. The resolution of the low-resolution blur estimation area is not higher than the resolution of the blur estimation area, and both of the resolutions may be equal to each other.

Subsequently, at step S203, the generator 1082 acquires signal variation information of the low-resolution blur estimation area, and it determines, based on the signal variation information, the number of corrected signal gradients that are generated at step S204 described below. The signal variation information is a signal change (signal change amount) in the low-resolution blur estimation area, in other words, information indicating an edge, a texture, or an amount of gradation which exists in the low-resolution blur estimation area. The signal variation information may be obtained based on the blurred signal gradient, or it may be obtained based on the corrected signal gradient obtained by correcting the signal gradient. In the latter case, the corrected signal gradient (a single or a plurality of corrected signal gradients) is previously generated, and the number of the corrected signal gradients generated at step S204 is determined based on the signal variation information obtained based on the corrected signal gradient. As described above, a linear independence of the system of linear equations represented by expression (1) decreases with reducing the signal variation in the corrected signal gradient. Accordingly, the generator 1082 determines the number of the corrected signal gradients to be generated based on the signal variation information. In this embodiment, the generator 1082 determines the number of the corrected signal gradients to be increased with reducing the signal variation (i.e., with reducing the signal change amount).

Hereinafter, an example of the signal variation information will be described. However, this embodiment is not limited thereto. A first example is directed to a method of using the signal gradient (i.e., blurred signal gradient) in the low-resolution blur estimation area. The signal gradient in the low-resolution blur estimation area is differentiated, and the sum of squares (or absolute values) of them is obtained as the signal variation information. The differentiation is a two-dimensional differentiation (for example, longitudinal and transverse differentiations). By the differentiation of the image, the signal variation in each pixel is obtained and the sum of squares of them is obtained to recognize the signal variation which is generated in the blur estimation area.

Preferably, the squares of the absolute values of the differential values are quantized and then the sum of them is obtained. If the sum is obtained without the quantization, a case where a lot of signal variation areas exist cannot be distinguished from a case where an extremely large signal variation exists in a narrow area. In the former case, there are a lot of variations in direction or strength of the edge or the texture. On the other hand, in the latter case, there are only a few variations. If there are only a few variations of the edges or the textures, the number of independent equations in the system of linear equations represented by expression (1) is small, and accordingly the estimation accuracy of the blur is decreased. Accordingly, it is preferred that the case where a lot of signal variations exist in the blur estimation area can be distinguished from the case where an extremely large signal variation exists in a narrow area. By the quantization, this distinction can be achieved.

For example, the sum is obtained after the binarization in which "1" is obtained if the square (or absolute value) of the differential value is larger than a predetermined threshold value, and on the other hand, "0" is obtained if it is smaller than the predetermined threshold value (i.e., a case of a flat portion). As a result, whether or not a lot of edges or textures exist can be distinguished. While the binarization method is used as quantization in this embodiment, the quantization may be performed with the larger number of bits. The example described above can be applied also to a case where the corrected signal gradient, instead of the burred signal gradient, is generated to be used.

Alternatively, a single corrected signal gradient may be previously generated to represent signals in a local area in the form of a row vector to obtain a matrix represented by arranging row vectors in different local areas to obtain a rank of the matrix as signal gradient information. This indicates a rank of a matrix $D_i$ in expression (14) below that is written in the form of the matrix based on expression (1).

$$b_i = D_i k_i + n_i \quad (14)$$

In expression (14), symbol $b_i$ denotes a vertical vector which has a component of each signal value in the low-resolution blur estimation area, symbol $k_i$ denotes a vertical vector which has each component of a blur, symbol $n_i$ denotes a vertical vector which has each component of a noise, and symbol $D_i$ denotes a matrix which has a component of each signal value of the corrected signal gradient. In this case, one corrected signal gradient is previously generated. Accordingly, the matrix $D_i$ has rows whose number corresponds to the number of pixels in the low-resolution blur estimation area, and the number of columns in the matrix corresponds to the number of component of the blur. A rank of the matrix $D_i$ clearly represents the linear independence of the system of linear equations, and accordingly it is preferred that this is used as the signal variation information. While whether or not a plurality of the same edges or textures exist cannot be recognized in the two examples described above, it can be evaluated by using the rank of the matrix $D_i$.

Subsequently, at step S204, the generator 1082 corrects a blur of the signal gradient in the low-resolution blur estimation area to generate a corrected signal gradient (correction processing on information relating to a signal in the blur estimation area). For the generation of the corrected signal gradient, as described above, the optimization according to expression (2), or other methods such as a super-resolution and an inverse filter is used. As a PSF which is used for the blur correction, a result (i.e., blur) estimated at step S205 in a previous loop is used. At the first time in the loop, a PSF having an appropriate shape (such as a gauss distribution and a one-dimensional line) is used. The number of the corrected signal gradients to be generated is the number determined at step S203, and in this embodiment a plurality of corrected signal gradients are generated at least once in the loop to improve the accuracy of the blur estimation. Preferably, in order to improve the estimation accuracy of the blur, the plurality of corrected signal gradients are generated in all the loops (i.e., iterative calculations). During the generation of the plurality of corrected signal gradients, a common PSF (blur) is used to generate the corrected signal gradients based on different correction processing or different correction parameters from each other. The plurality of the corrected signal gradients may be generated while the PSF is slightly changed. However, if the PSF is changed, an error occurs in the blur estimation at the subsequent stage. Accordingly, it is preferred that all the plurality of the corrected signal gradients being generated are generated by using the common PSF.

Subsequently, at step S205, the generator 1082 estimates the blur based on the signal gradient in the low-resolution blur estimation area and the corrected signal gradient (estimation processing of the blur). For the estimation of the blur, optimization represented by expressions (6) and (6a) or expressions (10) and (10a) or the like is used according to the number of the corrected signal gradients. When the plurality of corrected signal gradients have been generated at step S204, a blur common to at least two corrected signal gradients is estimated. For the estimation of the common blur, expression (10) or (10a) is used, and symbol G in each of expressions (10) and (10a) may coincide with the number of the corrected signal gradients determined at step S203 or may be smaller than the number. Hereinafter, this will be described referring to FIGS. 5 and 6.

Figure 5:
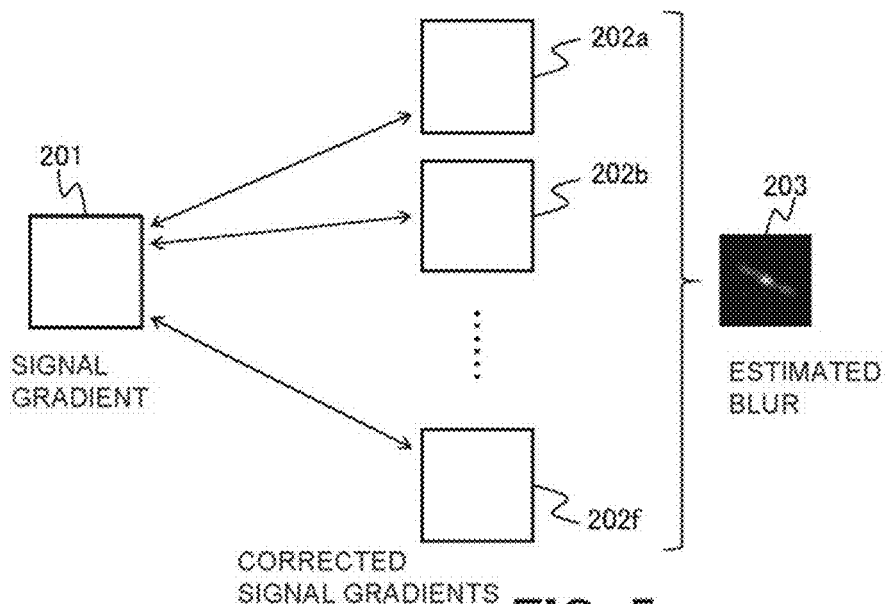
FIG. 5 is a diagram of illustrating an example of blur estimation in each of Embodiments 1 to 3.
Figure 6:
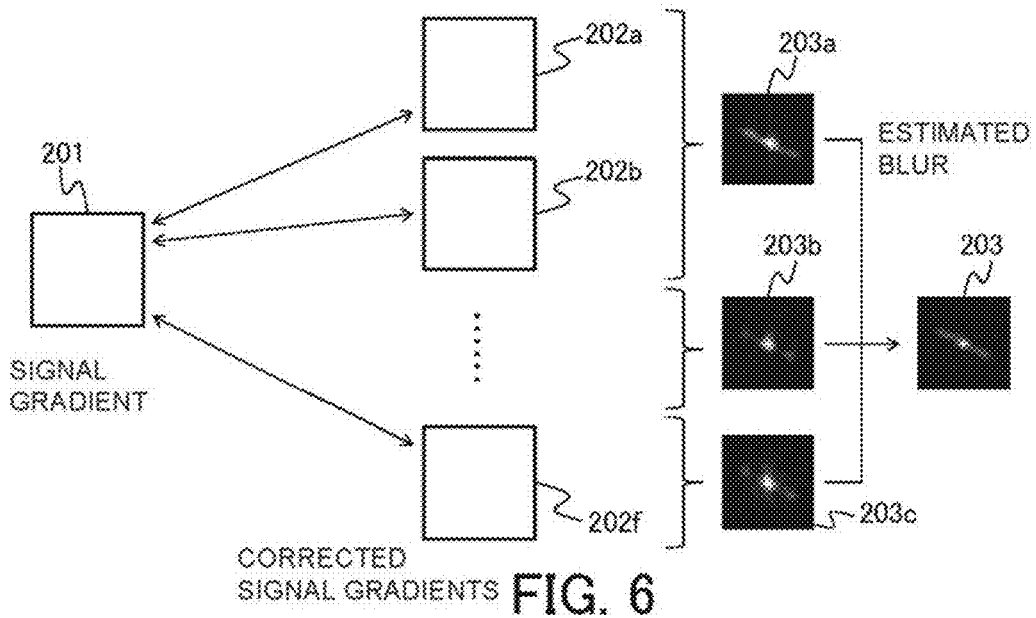
FIG. 6 is a diagram of illustrating an example of blur estimation in each of Embodiments 1 to 3.

FIGS. 5 and 6 are diagrams of illustrating an example of the blur estimation in this embodiment, and they illustrate a situation where six corrected signal gradients 202a to 202f are generated based on a signal gradient 201 in the blur estimation area and a blur 203 is estimated based on the corrected signal gradients 202a to 202f. However, the number of generation of the corrected signal gradients is not limited thereto. In FIG. 5, a blur 203 common to all the six corrected signal gradients 202a to 202f is estimated. In this case, G in expression (10) or (10a) is six. On the other hand, in FIG. 6, six corrected signal gradients are grouped into three groups, and blurs 203a to 203c common to the respective groups are estimated to obtain the blur 203. The blur 203a is estimated based on two corrected signal gradients 202a and 202b, and in this case G in expression (10) or (10a) is two. The blur 203b is estimated based on the three corrected signal gradients 202c to 202e, and in this case G is three. The blur 203c is estimated based on the corrected signal gradient 202f, and in this case expression (6) or (6a) is used for the estimation. The final blur 203 can be obtained by calculating a weighted average of the blurs 203a to 203c or the like. In the case of FIG. 5, for the six corrected signal gradients, the number of the estimated blur is one. On the other hand, in the case of FIG. 6, for the six corrected signal gradients, the number of the estimated blurs is three (because the blur 203 in FIG. 6 is obtained based on the estimated blurs 203a to 203c, it is not taken into consideration).

As described above, when a plurality of generated corrected signal gradients exist, the number of the blurs being estimated is smaller than the number of the corrected signal gradients. This embodiment includes both of the cases of FIGS. 5 and 6 in the blur estimation, and the case of FIG. 5 in which the number of the system of equations needed for consideration at the same time is larger is more preferable since the accuracy of the blur estimation is improved.

When the plurality of corrected signal gradients are generated by using the different correction processing or the different correction parameters from each other at step S204, it is preferred that the blur is estimated while weighting each of the corrected signal gradients. This corresponds to varying the weight $t_g$ (i.e., using a variable) instead of a constant in expression (10) or (10a). This is because the correction accuracy of the corrected signal gradient or the easiness of occurrence of a harmful effect such as ringing changes depending on the correction processing or the correction parameter. It is preferred that the weight increases for the corrected signal gradient of the correction processing or the correction parameter where the harmful effect does not easily occur.

Subsequently, at step S206, the generator 1082 compares the blur (second blur) estimated at step S205 (second estimation processing) with the blur (first blur) estimated at step S205 (first estimation processing) in the previous loop. Specifically, the generator 1082 determines whether or not a difference between the first blur and the second blur is not larger than a predetermined value (i.e., predetermined threshold value). When this difference is not larger than the predetermined value, the flow proceeds to step S208. On the other hand, when the difference is larger than the predetermined value, the flow proceeds to step S207. As described at step S202, in this embodiment, the generation of the corrected signal gradient (correction processing) and the estimation of the blur (estimation processing) are looped while the resolution in the blur estimation area is changed. With respect to the low-resolution blur estimation area in the early stage of the loops, the estimation result of the blur is easily converged since the number of pixels is small. On the other hand, when the number of the pixels in the low-resolution blur estimation area increases by the repetition (iteration) of the loop, the result is not easily converged. Furthermore, if signal changes such as edges are insufficient, the estimated blur is significantly deviated from an exact value. In order avoid this harmful effect, the generator 1082 evaluates the difference between the blur estimated in the current loop and the blur estimated in the previous loop. In this case, a bilinear interpolation is performed on one of the blurs estimated in the current loop and in the previous loop to resize it to have the same number of components of the other blur, and then the sum of squares for each component is obtained to evaluate the difference. However, this embodiment is not limited thereto, and alternatively other methods may be used. When the difference between both of them is larger than the predetermined value, it is considered that information of the signal change which is necessary for the blur estimation in the current loop is insufficient and the estimation accuracy is deteriorated. Accordingly, the number of the corrected signal gradients is increased to perform the blur estimation again. In the first loop, the estimated blur in the previous loop does not exist, and accordingly the flow proceeds to step S208 without performing this step.

At step S207, the generator 1082 increases the number of the corrected signal gradients being generated. This reason is as described above. Then, the flow returns to step S204, and the generator 1082 newly generates a plurality of corrected signal gradients. In this case, the generator 1082 may use (i.e., divert) the previously-generated corrected signal gradients instead of newly generating (i.e., updating) the corrected signal gradients.

At step S208, the generator 1082 determines whether or not the iterative (loop) calculation is completed, that is, whether or not the difference of the resolutions of the blur estimation area and the low-resolution blur estimation area is smaller than a predetermined value. This determination is performed by comparing the resolution of the blur estimation area with the resolution of the low-resolution blur estimation area. If the difference of the resolutions of them is smaller than the predetermined value, the iterative calculation is finished. Then, the blur estimated at step S205 is obtained as a final estimated blur, and the flow proceeds to step S210. Whether or not the difference of the resolutions of them is smaller than the predetermined value is not limited to whether nor not an absolute value of the difference of the resolutions of them is smaller than the predetermined value, and alternatively it may be determined based on whether a ratio of the resolutions of them is closer to 1 than the predetermined value is. If a predetermined condition is not satisfied (for example, if the absolute value of the difference of the resolutions of them is larger than the predetermined value), the resolution of the estimated blur is still insufficient, and accordingly the flow proceeds to step S209 to perform the iterative calculation.

At step S209, the generator 1082 sets a down-sampling parameter that is to be used at step S202. In order to increase the resolution through the iterative processing of steps S202 to S207, the parameter is set to decrease a degree of the down-sampling (i.e., to decrease a resolution reduction amount) compared with the previous loop. In the iterative calculation, a blur estimated at step S205 in the previous loop is used as an updated initial solution, and in this case the resolution of the blur needs to be increased. In order to improve the resolution, it is preferred that bilinear interpolation or bicubic interpolation is used.

At step S210, the generator 1082 performs denoising of the blur (estimated blur) estimated at step S205. As represented by expression (1), a noise exists in the burred image (blur estimation area), and accordingly a noise is generated in the estimated PSF due to the influence. Accordingly, the generator 1082 performs denoising processing. In the denoising processing, it is preferred that thresholding processing, opening processing that removes isolated points, denoising processing using the smoothing filter or the frequency resolving, or the like is used.

According to this embodiment, an image processing system which is capable of estimating a blur with high accuracy based on an area in a blurred image where a signal variation is small can be provided.

Embodiment 2

Figure 7:
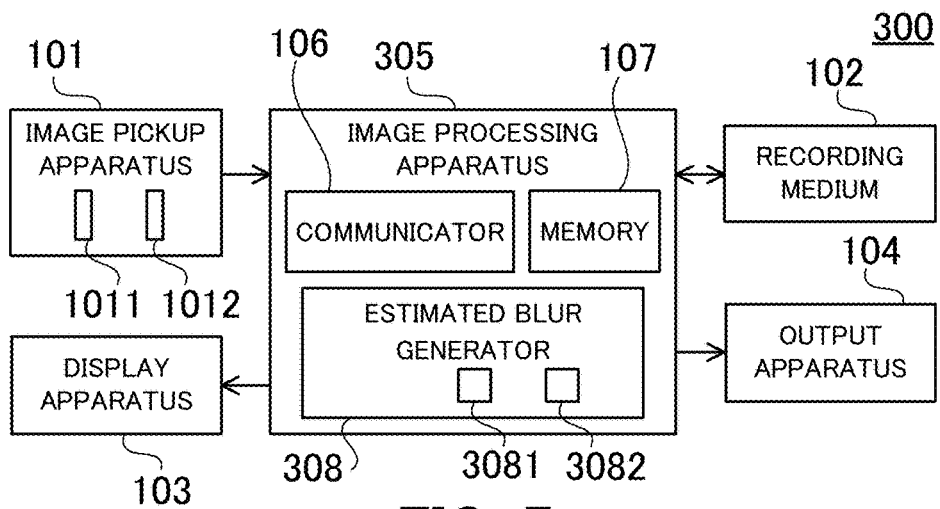
FIG. 7 is a block diagram of an image processing system in Embodiment 2.

Next, referring to FIG. 7, an image processing system in Embodiment 2 of the present invention will be described. FIG. 7 is a block diagram of an image processing system 300 in this embodiment.

The image processing system 300 of this embodiment is different from the image processing system 100 of Embodiment 1 in that the image processing system 300 includes an image processing apparatus 305 including an estimated blur generator 308 instead of the image processing apparatus 105 including the blur corrector 108. The image processing system 300 of this embodiment is capable of performing a blur estimation by simple processing compared with the image processing system 100 of Embodiment 1. The estimated blur generator 308 estimates and outputs a blur component based on a blurred image captured by the image pickup apparatus 101. Other configurations of the image processing system 300 are the same as those of the image processing system 100 in Embodiment 1, and accordingly descriptions thereof are omitted.

Figure 8:
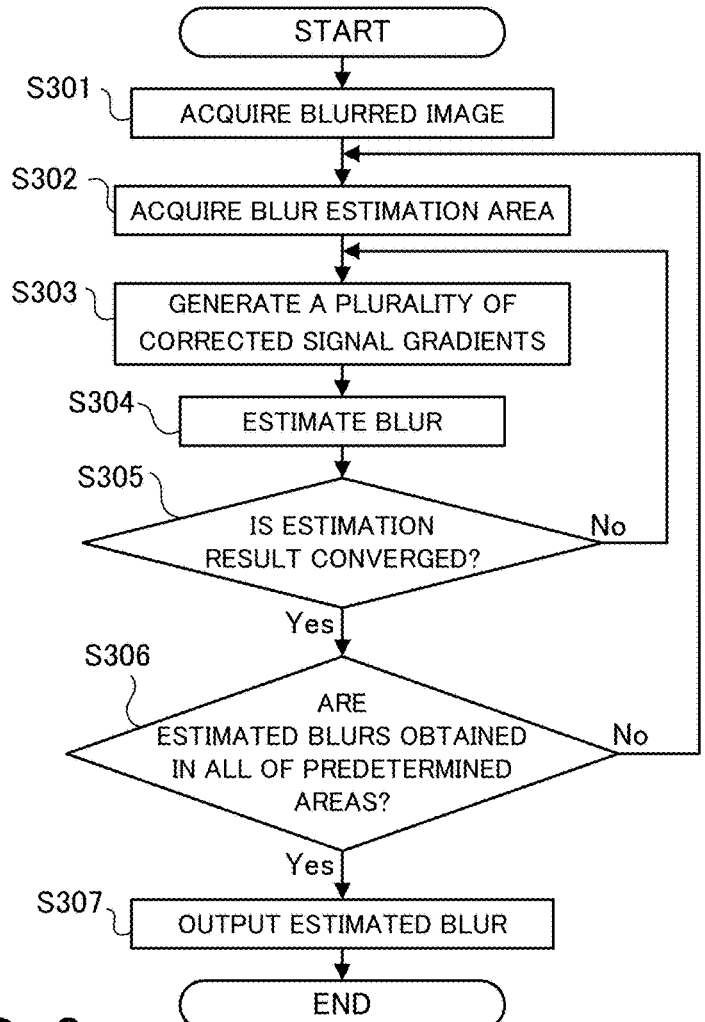
FIG. 8 is a flowchart of illustrating an image processing method in Embodiment 2.

Next, referring to FIG. 8, image processing which is performed by the estimated blur generator 308 will be described. FIG. 8 is a flowchart of illustrating an image processing method in this embodiment. Each step in FIG. 8 is performed by an acquirer 3081 (acquisition unit) and a generator 3082 (generation unit) of the estimated blur generator 308.

Step S301 in FIG. 8 is performed by the acquirer 3081 of the estimated blur generator 308, and step S302 is performed by the generator 3082 of the estimated blur generator 308. Steps S301 and S302 are the same as steps S101 and S102 in Embodiment 1 described referring to FIG. 4, respectively.

Subsequently, at step S303, the generator 3082 corrects the signal gradient of the blur estimation area to generate a signal gradient of the blur estimation area to generate a plurality of corrected signal gradients. Different correction processing or different correction parameters from each other are used for the generation of the plurality of corrected signal gradients. In this embodiment, the generator 3082 always generates the corrected signal gradients by the predetermined number. The correction processing at step S303 is the same as the correction processing described at step S204 in Embodiment 1. Subsequently, at step S304, the generator 3082 estimates a blur based on the signal gradient of the blur estimation area and the plurality of corrected signal gradients. The estimation processing at step S304 is the same as the estimation processing described at step S205 in Embodiment 1.

Subsequently, at step S305, the generator 3082 determines whether or not the blur (estimation result) estimated at step S304 is converged. When the blur is converged, the flow proceeds to step S306. On the other hand, when the blur is not converged, the flow returns to step S303, and the generator 3082 newly generates (or updates) a plurality of corrected signal gradients at step S303 by using the blur estimated at step S304. The determination whether or not the estimated blur is converged may be performed for example by obtaining a difference or a ratio between a corrected signal gradient which is deteriorated by the estimated blur and the signal gradient of the blur estimation area and compare it with a predetermined value. When the blur is estimated by the iterative calculation such as a conjugate gradient method at step S304, the determination may be performed depending on whether or not an updated amount of the blur by the iterative calculation is smaller than a predetermined value. When the estimated blur is converged, the generator 3082 treats the estimated blur as a finally determined estimated blur (final estimated blur) in the blur estimation area.

Subsequently, at step S306, the generator 3082 determines whether or not the generation of the estimated blur is completed for all the predetermined areas in the blurred image (for example, a whole of the blurred image). Step S306 is the same as step S104 in Embodiment 1. If the generation of the estimated blur is completed, the flow proceeds to step S307. On the other hand, if the generation of the estimated blur is not completed, the flow returns to step S302.

At step S307, the generator 3082 outputs the generated estimated blur. When the plurality of blur estimation areas are included in a predetermined area in the blurred image (i.e., in a case of Shift-variant), there are a plurality of estimated blurs. Accordingly, the generator 3082 outputs the plurality of estimated blurs. When the plurality of estimated blurs exist, they may be output sequentially in the process of obtaining them. The output estimated blur can be used for the correction of the blurred image, the measurement of the optical performance of the optical system for the photography, the analysis of a hand shake during the photography, or the like.

According to this embodiment, an image processing system which is capable of estimating a blur with high accuracy based on an area in a blurred image where a signal variation is small can be provided.

Embodiment 3

Figure 9:
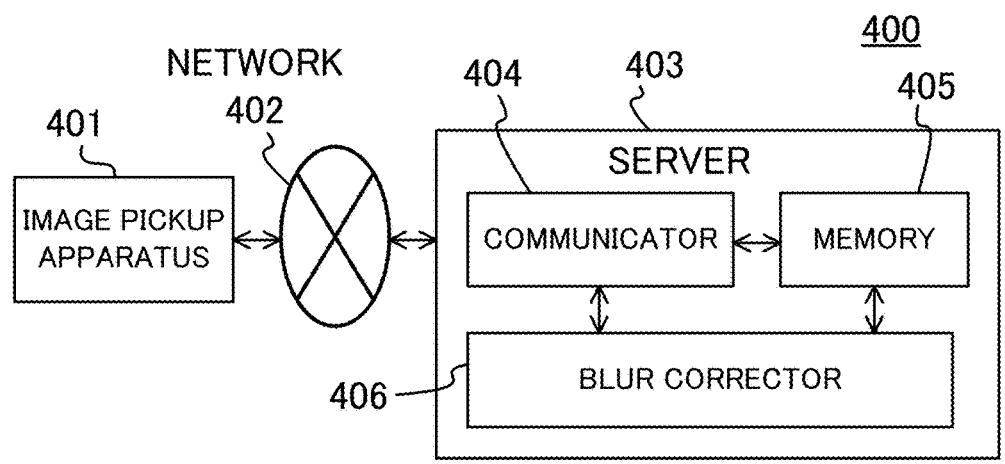
FIG. 9 is a block diagram of an image pickup system in Embodiment 3.
Figure 10:
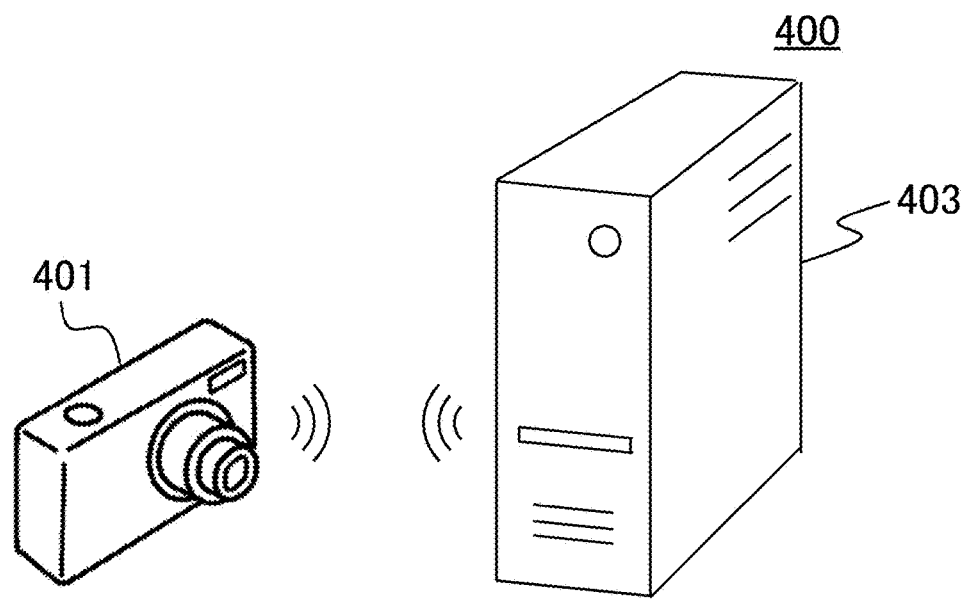
FIG. 10 is an external view of the image pickup system in Embodiment 3.

Next, referring to FIGS. 9 and 10, an image pickup system in Embodiment 3 of the present invention will be described. FIG. 9 is a block diagram of an image pickup system 400 in this embodiment. FIG. 10 is an external view of the image pickup system 400.

The image pickup system 400 includes an image pickup apparatus 401, a network 402, and a server 403 (image processing apparatus). The image pickup apparatus 401 and the server 403 are connected through wire, and an image from the image pickup apparatus 401 is transferred to the server 403 to perform estimation and correction of a blur.

The server 403 includes a communicator 404, a memory 405 and a blur corrector 406 (image processor). The communicator 404 of the server 403 is connected with the image pickup apparatus 401 through the network 402. While the image pickup apparatus 401 and the server 403 are connected wirelessly in this embodiment, it is not limited thereto, and they may be connected through wire. The communicator 404 of the server 403 is configured to receive a blurred image from the image pickup apparatus 401. When the image pickup apparatus 401 captures an image, the blurred image (input image or captured image) is input to the server 403 automatically or manually, and it is sent to the memory 405 and the blur corrector 406. The memory 405 stores the blurred image and information relating to an image capturing condition determined when capturing the blurred image. The blur corrector 406 estimates a blur (estimated blur) based on the blurred image. Then, the blur corrector 406 generates a blur-corrected image based on the estimated blur. The blur-corrected image is stored in the memory 405 or it is sent to the image pickup apparatus 401 through the communicator 404.

In order to achieve the image processing method of this embodiment, software (image processing program) can be supplied to the server 403 through a network or a non-transitory computer-readable storage medium such as a CD-ROM. In this case, the image processing program is read out by a computer (such as a CPU and a MPU) of the server 403 to execute a function of the server 403.

Processing which is performed by the blur correction portion 406 is the same as the image processing method of Embodiment 1 described referring to FIGS. 1 and 4, and accordingly descriptions thereof are omitted. According to this embodiment, an image pickup system which is capable of estimating a blur with high accuracy based on an area in a blurred image where a signal variation is small can be provided.

As described above, in each embodiment, an image processing apparatus (image processing apparatus 105, 305, or server 403) includes an acquirer 1081 or 3081 (acquisition unit) and a generator 1082 or 3082 (generation unit). The acquirer acquires a blurred image (captured image or input image). The generator acquires a blur estimation area of at least a part of the blurred image to generate an estimated blur based on the blur estimation area. The generator performs correction processing (S204) in which a blur included in information relating to a signal (i.e., signal gradient) in the blur estimation area is corrected to generate information relating to a correction signal (i.e., corrected signal gradient). The generator also performs estimation processing (S205) in which a blur is estimated based on the information relating to the signal and the information relating to the correction signal. Furthermore, the generator generates the estimated blur by performing iterative calculation processing (S204 to S207) that repeats the correction processing and the estimation processing. In addition, the generator generates, as the information relating to the correction signal, information relating to a plurality of correction signals by using a plurality of calculation expressions different from each other in at least one correction processing during the iterative calculation processing.

Preferably, the generator changes a type or a parameter (coefficient) of the plurality of calculation expressions to generate the information relating to the plurality of correction signals. Preferably, the generator corrects, as the information relating to the signal, information relating to a luminance distribution in the blur estimation area or information relating to a differential value (signal gradient) of the luminance distribution. Preferably, when generating the information relating to the plurality of correction signals in the correction processing, the generator estimates a blur common to information relating to at least two correction signals in the estimation processing. In this case, the total number of blurs estimated in the estimation processing is smaller than the total number of pieces of the information relating to the plurality of correction signals. More preferably, when generating the information relating to the plurality of correction signals in the correction processing, the generator estimates a blur common to all pieces of the information relating to the plurality of correction signals in the estimation processing.

Preferably, the generator corrects the information relating to the signal by using an identical blur to generate the information relating to the plurality of correction signals. Preferably, the generator generates, as the information relating to the correction signal, information relating to the plurality of correction signals by using the plurality of calculation expressions different from each other in all of the correction processing in the iterative calculation processing. Preferably, when generating the information relating to the plurality of correction signals in the correction processing, the generator weights each of pieces of the information relating to the plurality of correction signals to estimate the blur in the estimation processing (S204). Preferably, the generator performs, as the estimation processing in the iterative calculation processing, first estimation processing and second estimation processing after the first estimation processing. The generator also determines a difference between a first blur estimated in the first estimation processing and a second blur estimated in the second estimation processing. Furthermore, the generator increases the number of pieces of the information relating to the plurality of correction signals and performs the estimation processing again when the difference is larger than a predetermined threshold value (S206).

Preferably, the generator determines the number of pieces of the information relating to the plurality of correction signals based on information (i.e., signal variation information) relating to a signal variation in the blur estimation area (S203). Preferably, the generator reduces a resolution of the blur estimation area to generate a low-resolution blur estimation area. The generator also performs the iterative calculation processing that repeats the correction processing and the estimation processing, the correction processing correcting the blur included in the information relating to the signal in the low-resolution blur estimation area to generate the information relating to the correction signal, and the estimation processing estimating the blur based on the information relating to the signal and the information relating to the correction signal. Thus, the generator generates the estimated blur. Furthermore, the generator reduces a difference between a resolution of the low-resolution blur estimation area and the resolution of the blur estimation area during the iterative calculation processing (i.e., decreases a degree of a reduction amount of the resolution of the blur estimation area: S209).

Preferably, the generator acquires a noise amount included in the blur estimation area, and performs frequency resolving of the blur estimation area to generate a frequency-resolved blur estimation area. Then, the generator performs denoising processing on the frequency-resolved blur estimation area based on the noise amount, and resynthesizes the denoised frequency-resolved blur estimation area (S201). More preferably, the image processing apparatus further includes a corrector 1083 (correction unit) that corrects at least a part of the blurred image by using the estimated blur.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each embodiment, an image processing apparatus, an image pickup apparatus, an image processing method, and a non-transitory computer-readable storage medium which are capable of estimating a blur with high accuracy based on an area in a blurred image where a signal variation is small can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-121679, filed on Jun. 17, 2015, which is hereby incorporated by reference herein in its entirety.

What is claimed is:

1. An image processing apparatus comprising:
a memory configured to store instructions; and
a processor connected to the memory and configured to execute the instructions to:
acquire a blurred image;
acquire a blur estimation area corresponding to at least a part of the blurred image;
generate an estimated blur based on the acquired blur estimation area by performing iterative calculation processing that repeats correction processing and estimation processing, the correction processing correcting a blur included in information relating to a signal in the blur estimation area to generate information relating to a correction signal, and the estimation processing estimating a blur based on the information relating to the signal and the information relating to the correction signal;
generate, as the information relating to the correction signal, information relating to a plurality of correction signals using a plurality of calculation expressions different from each other in at least one correction processing during the iterative calculation processing; and
correct at least a part of the blurred image based on the estimated blur.

2. The image processing apparatus according to claim 1, wherein a type or a parameter of the plurality of calculation expressions is changed to generate the information relating to the plurality of correction signals.

3. The image processing apparatus according to claim 1, wherein the information relating to the signal includes information relating to a luminance distribution in the blur estimation area or information relating to a differential value of the luminance distribution.

4. The image processing apparatus according to claim 1, wherein:
when generating the information relating to the plurality of correction signals in the correction processing, a blur common to information relating to at least two correction signals is estimated in the estimation processing, and
the total number of blurs estimated in the estimation processing is smaller than the total number of pieces of the information relating to the plurality of correction signals.

5. The image processing apparatus according to claim 4, wherein when generating the information relating to the plurality of correction signals in the correction processing, a blur common to all pieces of the information relating to the plurality of correction signals is estimated in the estimation processing.

6. The image processing apparatus according to claim 1, wherein the information relating to the signal is corrected by using an identical blur to generate the information relating to the plurality of correction signals.

7. The image processing apparatus according to claim 1, wherein the information relating to the plurality of correction signals is generated by using the plurality of calculation expressions different from each other in all the correction processing in the iterative calculation processing.

8. The image processing apparatus according to claim 1, wherein when generating the information relating to the plurality of correction signals in the correction processing, each of pieces of the information relating to the plurality of correction signals is weighted to estimate the blur in the estimation processing.

9. The image processing apparatus according to claim 1, wherein the processor is configured to execute further instructions to:
perform, as the estimation processing in the iterative calculation processing, first estimation processing and second estimation processing after the first estimation processing;
determine a difference between a first blur estimated in the first estimation processing and a second blur estimated in the second estimation processing; and
increase the number of pieces of the information relating to the plurality of correction signals and perform the estimation processing again when the difference is larger than a predetermined threshold value.

10. The image processing apparatus according to claim 1, wherein the number of pieces of the information relating to the plurality of correction signals is determined based on information relating to a signal variation in the blur estimation area.

11. The image processing apparatus according to claim 1, wherein the processor is configured to execute further instructions to:
reduce a resolution of the blur estimation area to generate a low-resolution blur estimation area;
generate the estimated blur by performing the iterative calculation processing that repeats the correction processing and the estimation processing, the correction processing correcting the blur included in the information relating to the signal in the low-resolution blur estimation area to generate the information relating to the correction signal, and the estimation processing estimating the blur based on the information relating to the signal and the information relating to the correction signal; and
reduce a difference between a resolution of the low-resolution blur estimation area and the resolution of the blur estimation area during the iterative calculation processing.

12. The image processing apparatus according to claim 1, wherein the processor is configured to execute further instructions to:
acquire a noise amount included in the blur estimation area;
perform frequency resolving of the blur estimation area to generate a frequency-resolved blur estimation area;
perform denoising processing on the frequency-resolved blur estimation area based on the noise amount; and
resynthesize the denoised frequency-resolved blur estimation area.

13. An image pickup apparatus comprising:
an image pickup element configured to photoelectrically convert an optical image formed via an optical system to output an image signal;
a memory configured to store instructions; and
a processor connected to the memory and configured to execute the instructions to:
acquire a blurred image;
acquire a blur estimation area corresponding to at least a part of the blurred image;
generate an estimated blur based on the acquired blur estimation area by performing iterative calculation processing that repeats correction processing and estimation processing, the correction processing correcting a blur included in information relating to a signal in the blur estimation area to generate information relating to a correction signal, and the estimation processing estimating a blur based on the information relating to the signal and the information relating to the correction signal; and
generate, as the information relating to the correction signal, information relating to a plurality of correction signals using a plurality of calculation expressions different from each other in at least one correction processing during the iterative calculation processing; and
correct at least a part of the blurred image based on the estimated blur.

14. An image processing method comprising:
acquiring a blurred image;
acquiring a blur estimation area corresponding to at least a part of the blurred image;
generating an estimated blur based on the acquired blur estimation area
by performing iterative calculation processing that repeats correction processing and estimation processing, the correction processing correcting a blur included in information relating to a signal in the blur estimation area to generate information relating to a correction signal, and the estimation processing estimating a blur based on the information relating to the signal and the information relating to the correction signal;
generating, as the information relating to the correction signal, information relating to a plurality of correction signals using a plurality of calculation expressions different from each other in at least one correction processing during the iterative calculation processing; and
correcting at least a part of the blurred image based on the estimated blur.

15. A non-transitory computer-readable storage medium which stores an image processing program causing a computer to execute a process comprising:
acquiring a blurred image;
acquiring a blur estimation area corresponding to at least a part of the blurred image;
generating an estimated blur based on the acquired blur estimation area
by performing iterative calculation processing that repeats correction processing and estimation processing, the correction processing correcting a blur included in information relating to a signal in the blur estimation area to generate information relating to a correction signal, and the estimation processing estimating a blur based on the information relating to the signal and the information relating to the correction signal;
generating, as the information relating to the correction signal, information relating to a plurality of correction signals using a plurality of calculation expressions different from each other in at least one correction processing during the iterative calculation processing; and
correcting at least a part of the blurred image based on the estimated blur.

\* \* \* \* \*